(12) United States Patent
Kawaba

(10) Patent No.: US 8,903,861 B2
(45) Date of Patent: Dec. 2, 2014

(54) TECHNIQUE FOR IDENTIFYING KEY FOR ASSOCIATING MESSAGES

(75) Inventor: Motoyuki Kawaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 417 days.

(21) Appl. No.: 13/165,509

(22) Filed: Jun. 21, 2011

(65) Prior Publication Data

US 2012/0089613 A1 Apr. 12, 2012

(30) Foreign Application Priority Data

Oct. 8, 2010 (JP) ................................. 2010-228982

(51) Int. Cl.
*G06F 17/30* (2006.01)
*H04L 12/58* (2006.01)

(52) U.S. Cl.
CPC .......... *H04L 51/22* (2013.01); *G06F 17/30587* (2013.01)
USPC ....................................................... 707/790

(58) Field of Classification Search
CPC .................... G06F 17/30289; G06F 17/30292; G06F 17/30587; G06F 17/30595
USPC .................. 707/749, 750, 751, 790
See application file for complete search history.

(56) References Cited

U.S. PATENT DOCUMENTS

| | | | |
|---|---|---|---|
| 5,740,355 A | 4/1998 | Watanabe et al. | |
| 5,819,266 A | 10/1998 | Agrawal et al. | |
| 6,154,642 A * | 11/2000 | Dumont et al. | 455/403 |
| 6,438,603 B1 * | 8/2002 | Ogus | 709/233 |
| 7,873,594 B2 | 1/2011 | Harada et al. | |
| 2008/0240515 A1 * | 10/2008 | Uno et al. | 382/115 |
| 2009/0248899 A1 | 10/2009 | Kawaba et al. | |
| 2011/0087630 A1 * | 4/2011 | Harada et al. | 707/603 |

FOREIGN PATENT DOCUMENTS

| | | |
|---|---|---|
| JP | 8-263346 A | 10/1996 |
| JP | 9-128342 A | 5/1997 |
| JP | 2008-041041 A | 2/2008 |

* cited by examiner

*Primary Examiner* — Thu-Nguyet Le
(74) *Attorney, Agent, or Firm* — Fujitsu Patent Center

(57) ABSTRACT

A method for identifying a key for associating messages include: extracting attribute values for a first attribute, which are included in messages, and appearance times of the messages, from a message storage unit storing messages, each including one or plural attribute values for one or plural attributes, and appearance times of corresponding messages; calculating, for each of the extracted attribute values for the first attribute, a difference between an earliest appearance time and a latest appearance time among the appearance times of the messages including a corresponding attribute value; determining whether or not a ratio of differences that are shorter than a predetermined period is equal to or greater than a predetermined threshold; and upon determining that the ratio is not less than the predetermined threshold, storing data representing the first attribute is a candidate of a key for associating the messages stored in the message storage unit.

5 Claims, 13 Drawing Sheets

FIG.2

| APPEARANCE TIME | MESSAGE |
|---|---|
| TIME1 | ATTRIBUTE A=ATTRIBUTE VALUE 1 ATTRIBUTE B=ATTRIBUTE VALUE 2 ... |
| TIME2 | ATTRIBUTE A=ATTRIBUTE VALUE 3 ATTRIBUTE B=ATTRIBUTE VALUE 2 ... |
| TIME3 | ATTRIBUTE A=ATTRIBUTE VALUE 1 ATTRIBUTE B=ATTRIBUTE VALUE 4 ... |
| TIME4 | ATTRIBUTE A=ATTRIBUTE VALUE 5 ATTRIBUTE B=ATTRIBUTE VALUE 4 ... |
| ... | ... |

FIG.4

| ATTRIBUTE VALUE | LIFE TIME |
|---|---|
| ATTRIBUTE VALUE 1 | 4 |
| ATTRIBUTE VALUE 3 | 5 |
| ATTRIBUTE VALUE 5 | 4 |
| ... | ... |

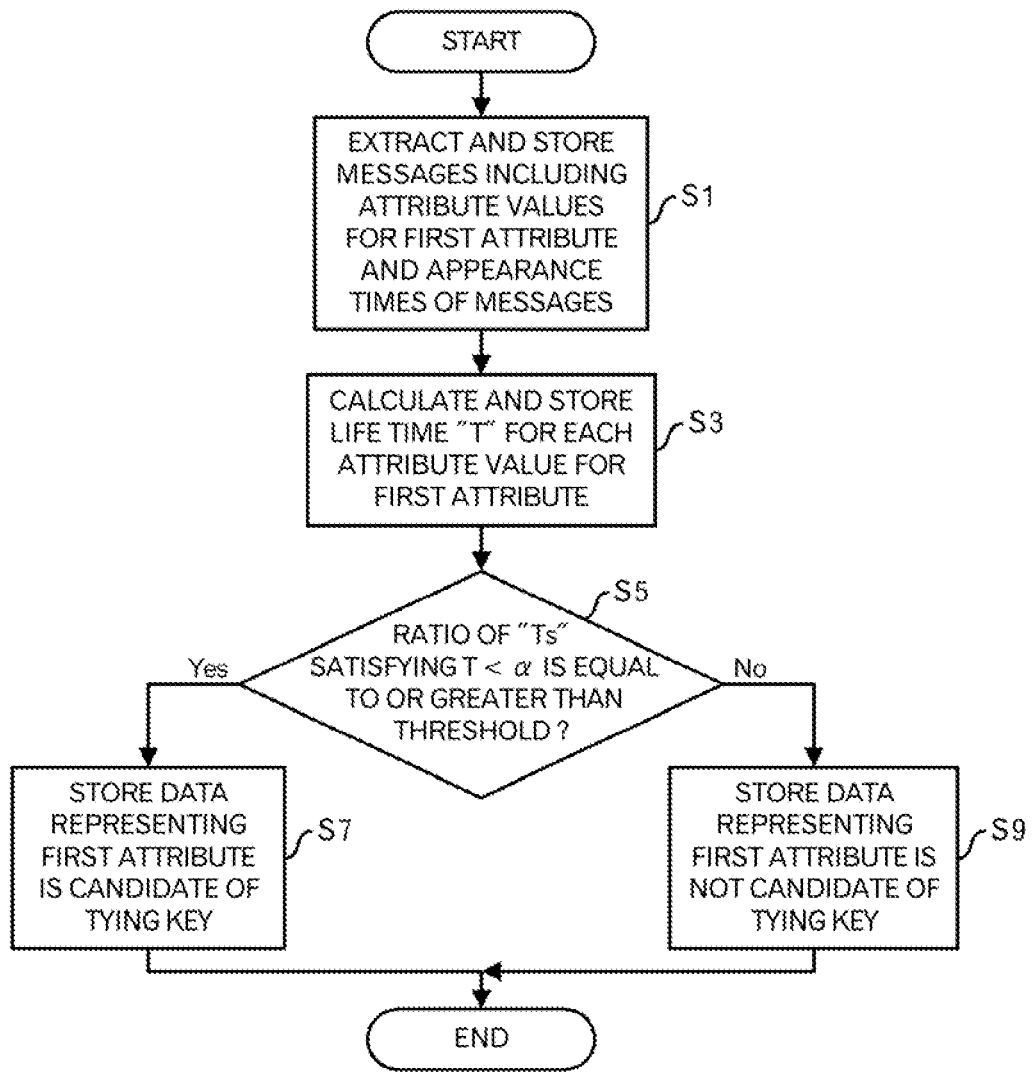

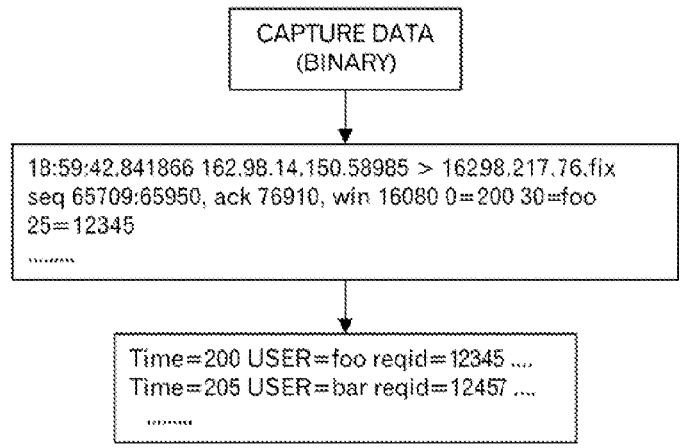

FIG.8

```
TIME1   MSG1   "req=10 VER=1"
TIME2   MSG2   "req=10 seq=1 VER=1"
TIME3   MSG3   "seq=1"
TIME4   MSG4   "req=30 VER=1"
TIME5   MSG5   "req=30 seq=3 VER=1"
TIME6   MSG6   "seq=3"
TIME7   MSG7   "seq=1 VER=1"
TIME8   MSG8   "req=10 VER=1"
TIME9   MSG9   "seq=3 VER=1"
TIME10  MSG10  "req=20 VER=1"
TIME11  MSG11  "req=20 seq=2 VER=1"
TIME12  MSG12  "req=30 VER=1"
TIME13  MSG13  "seq=2"
TIME14  MSG14  "seq=2 memo=foo VER=1"
TIME15  MSG15  "req=20 memo=foo VER=1"
TIME16  MSG16  "req=40 VER=1"
TIME17  MSG17  "req=40 seq=4 VER=1"
TIME18  MSG18  "seq=4"
TIME19  MSG19  "req=50 VER=1"
TIME20  MSG20  "req=50 seq=5 VER=1"
TIME21  MSG21  "seq=5"
TIME22  MSG22  "seq=4 VER=1"
TIME23  MSG23  "req=40 VER=1"
TIME24  MSG24  "seq=5 VER=1"
TIME25  MSG25  "req=60 VER=1"
TIME26  MSG26  "req=60 seq=6 VER=1"
TIME27  MSG27  "req=50 VER=1"
TIME28  MSG28  "seq=6"
TIME29  MSG29  "seq=6 VER=1"
TIME30  MSG30  "req=60 VER=1"
```

FIG.9

| ATTRIBUTE | ATTRIBUTE VALUE | EARLIEST APPEARANCE TIME | LATEST APPEARANCE TIME | LIFE TIME |
|---|---|---|---|---|
| req | 10 | 1 | 8 | |
| VER | 1 | 1 | 30 | |
| seq | 1 | 2 | 7 | |
| req | 30 | 4 | 12 | |
| ⋮ | ⋮ | ⋮ | ⋮ | |

| ATTRIBUTE | ATTRIBUTE VALUE | EARLIEST APPEARANCE TIME | LATEST APPEARANCE TIME | LIFE TIME |
|---|---|---|---|---|
| req | 10 | 1 | 8 | 7 |
| VER | 1 | 1 | 30 | 29 |
| seq | 1 | 2 | 7 | 5 |
| req | 30 | 4 | 12 | 8 |
| ⋮ | ⋮ | ⋮ | ⋮ | ⋮ |

| ATTRIBUTE | DATARMINATION FLAG |
|---|---|
| req | Yes |
| VER | No |
| seq | Yes |
| ⋮ | ⋮ |

TECHNIQUE FOR IDENTIFYING KEY FOR ASSOCIATING MESSAGES

CROSS-REFERENCE TO RELATED APPLICATIONS

This application is based upon and claims the benefit of priority of the prior Japanese Patent Application No. 2010-228982, filed on Oct. 8, 2010, the entire contents of which are incorporated herein by reference.

FIELD

This technique relates to a technique for associating messages.

BACKGROUND

For example, in a system including servers in plural layers such as a Web three-layer system, a processing proceeds while exchanging messages among the servers. Such a system frequently becomes large-scale and complex, and when a problem occurred, a lot of labors and long time may be required for the handling of the problem. Then, a technique exists, in which, by collecting messages exchanged among the servers and carrying out a processing to associate the messages for each transaction (hereinafter, referred to tying processing), the proceeding status of the processing in the system is easily grasped.

As one of methods for the aforementioned tying processing, there is a method for associating messages based on tag information included in the messages. Here, the tag information is information including attributes and values of the attributes. For example, when data "8=FIX.4.1 9=112 35=0 49=BRKR 56=INVMGR 34=235 52=19980604-07:58:28 11=19980604-07:58:28 10=157" is included in a communication message by a Financial Information eXchange (FIX) protocol, portions in a format "AA=BB" such as "8=FIX.4.1" and "9=112" are tag information. Here, the number on the left side of "=" represents an attribute, and data on the right side of "=" represents an attribute value.

In the tying processing based on the tag information, plural messages having the same attribute value for the same attribute are associated as the messages belonging to the same transaction. Therefore, an attribute whose attribute value is the same as that in messages belonging to plural transactions is not suitable for the attribute (hereinafter, referred to a tying key) for associating the messages. Therefore, in the tying processing based on the tag information, whether or not the tying key can be identified appropriately is one of points in this technical field.

Conventionally, a technique exists to identify the tying key for associating the messages from the messages that have been associated. Specifically, a message type, character string included in the message and data flow amount when transferring the character string are obtained from the respective messages associated with each other. Then, character strings unnecessary for the tying key are excluded based on the obtained information, and an order of the character strings used for the tying processing is determined.

However, in order to identify the messages to be associated in advance, a person who has the knowledge concerning application programs activated in the system carries out a work for analyzing the messages. However, it is frequently difficult to identify the messages to be associated, by actually carrying out such a work.

Namely, the conventional techniques cannot identify candidates of the tying keys to associate the messages from among messages that have not been associated yet.

SUMMARY

This information processing method includes: (A) extracting attribute values for a first attribute, which are included in messages, and appearance times of the messages, from a message storage unit storing messages, each including one or plural attribute values for one or plural attributes, and appearance times of corresponding messages; (B) calculating, for each of the extracted attribute values for the first attribute, a difference between an earliest appearance time and a latest appearance time among the appearance times of the messages including a corresponding attribute value; (C) determining whether or not a ratio of differences that are shorter than a predetermined period is equal to or greater than a predetermined threshold; and (D) upon determining that the ratio is equal to or greater than the predetermined threshold, storing data representing the first attribute is a candidate of a key for associating the messages stored in the message storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram depicting an example of data stored in a message storage unit;

FIG. 3 is a diagram depicting a processing flow of a processing relating to the first embodiment;

FIG. 4 is a diagram depicting an example of data stored in a second data storage unit;

FIG. 5 is a diagram depicting an example of data stored in a third data storage unit;

FIG. 8 is a diagram to explain a processing carried out by a protocol analyzer;

FIG. 9 is a diagram depicting data to be processed in the second embodiment;

FIG. 21 is a diagram depicting examples of logs outputted by an infrastructure executed by an application program; and FIG. 22 is a functional block diagram of a computer.

DESCRIPTION OF EMBODIMENTS

[Embodiment 1]

Figure 1:
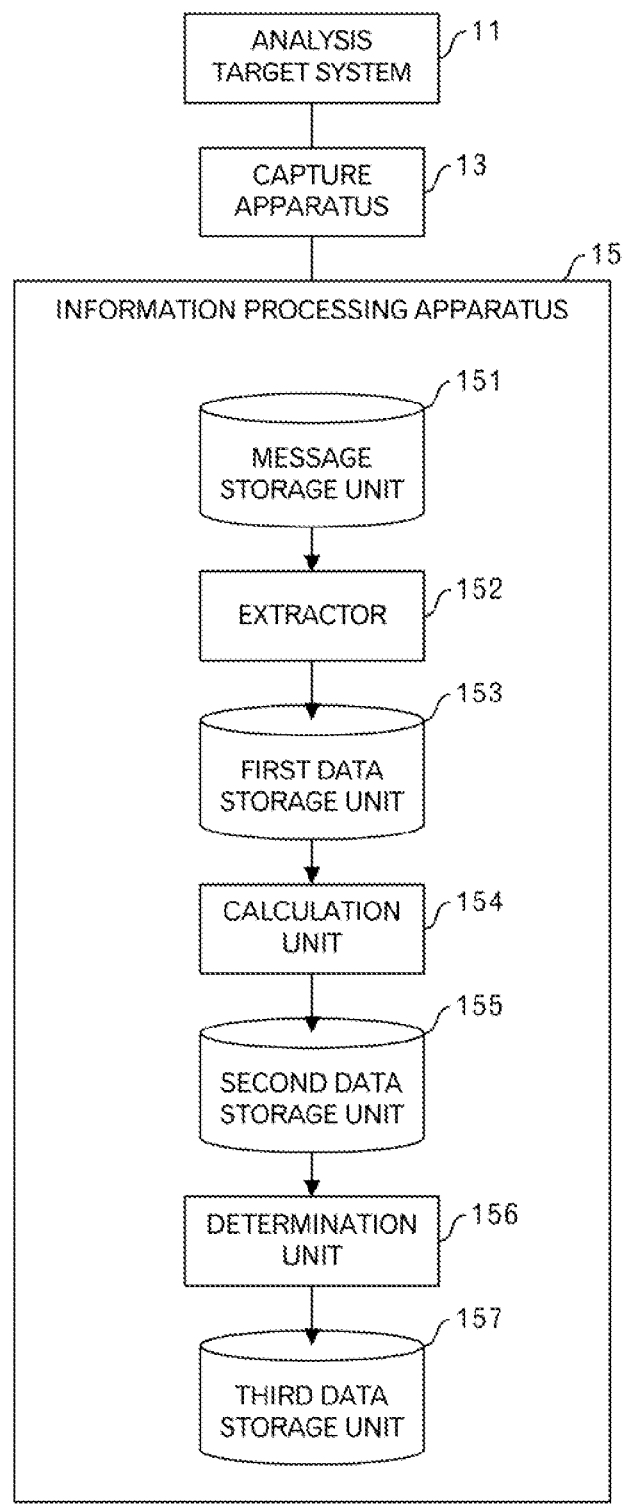
FIG. 1 is a diagram depicting a system outline relating to a first embodiment.

FIG. 1 illustrates a system outline relating to a first embodiment. For example, an analysis target system 11 such as an electronic commerce system is connected with a capture apparatus 13 through a network such as Local Area Network (LAN). In addition, the capture apparatus 13 is connected with an information processing apparatus 15 through a network such as LAN. Incidentally, although it is not depicted, the analysis target system 11 includes plural servers, and carries out a processing while exchanging messages among the servers.

The capture apparatus 13 gathers the messages exchanged among the servers included in the analysis target system 11, for example, by port mirroring. Then, the capture apparatus 13 attaches data of time (hereinafter, referred to an appearance time) when the message is gathered to the gathered message, and transmits the messages with the data of time to the information processing apparatus 15.

The information processing apparatus 15 includes a message storage unit 151, extractor 152, first data storage unit 153, calculation unit 154, second data storage unit 155, determination unit 156 and third data storage unit 157.

The extractor 152 carries out a processing using data stored in the message storage unit 151, and stores processing results into the first data storage unit 153. The calculation unit 154 carries out a processing using data stored in the first data storage unit 153, and stores processing results into the second data storage unit 155. The determination unit 156 carries out a processing using data stored in the second data storage unit 155, and stores processing results into the third data storage unit 157.

FIG. 2 illustrates an example of data stored in the message storage unit 151. In an example of FIG. 2, a message received from the capture apparatus 13 and an appearance time of the message are stored. Each of the messages includes an attribute value or attribute values for one or plural attributes.

Next, processing contents of the information processing apparatus 15 illustrated in FIG. 1 is explained by using FIG. 3. First, the extractor 152 of the information processing apparatus 15 extracts messages including attribute values for an attribute to be processed (hereinafter, referred to a first attribute) and the appearance times of the messages from the message storage unit 151, and stores the extracted data into the first data storage unit 153 (FIG. 3: step S1). A data format of the data stored in the first data storage unit 153 is the same as the format of the data stored in the message storage unit 151.

Then, the calculation unit 154 calculates a life time T for each attribute value for the first attribute by using data stored in the first data storage unit 153, and stores the calculated life time into the second data storage unit 155 (step S3). The life time T is calculated by computing a difference between the earliest appearance time and the latest appearance time among the appearance times of the messages including a certain attribute value for the first attribute value.

FIG. 4 illustrates an example of data stored in the second data storage unit 155. In an example of FIG. 4, an attribute value and life time are stored.

Returning to explanation of FIG. 3, the determination unit 156 determines whether or not a ratio of the life times T satisfying T<α among the life times stored in the second data storage unit 155 is equal to or greater than a threshold (step S5). Here, α is a threshold to determine whether or not T is a sufficiently small value. This is based on consideration that the attributes whose ratio of the attribute values whose life time is short is high are more likely to be attributes whose attribute value is unique for each transaction.

Then, when it is determined that the ratio of the life times T satisfying T<α is equal to or greater than the predetermined threshold (step S5: Yes route), the determination unit 156 stores data "Yes" representing the first attribute is a candidate of the tying key into the third data storage unit 157 in association with the first attribute (step S7).

FIG. 5 illustrates an example of data stored in the third data storage unit 157. In an example of FIG. 5, an attribute and data representing whether or not this attribute is a candidate of the tying key are stored. When the data representing whether or not this attribute is a candidate of the tying key is "Yes", this represents this attribute is the candidate of the tying key, and when the data is "No", this represents this attribute is not a candidate of the tying key.

On the other hand, when it is determined that the ratio of the life times T satisfying T<α is less than the predetermined threshold (step S5: No route), the determination unit 156 stores data "No" representing this attribute is not the candidate of the tying key into the third data storage unit 157 in association with the first attribute (step S9). Then, a processing unit displays the data stored in the third data storage unit 157 on a display device or sends the data to a terminal operated by an administrator of the information processing apparatus 15 or the like. Then, the administrator or the like judges whether or not the first attribute can be used as the tying key. Then, the processing is completed.

By carrying out the aforementioned processing, it becomes possible to identify candidates of the tying key for associating the messages from among the messages that have not been associated.

[Embodiment 2]

Figure 6:
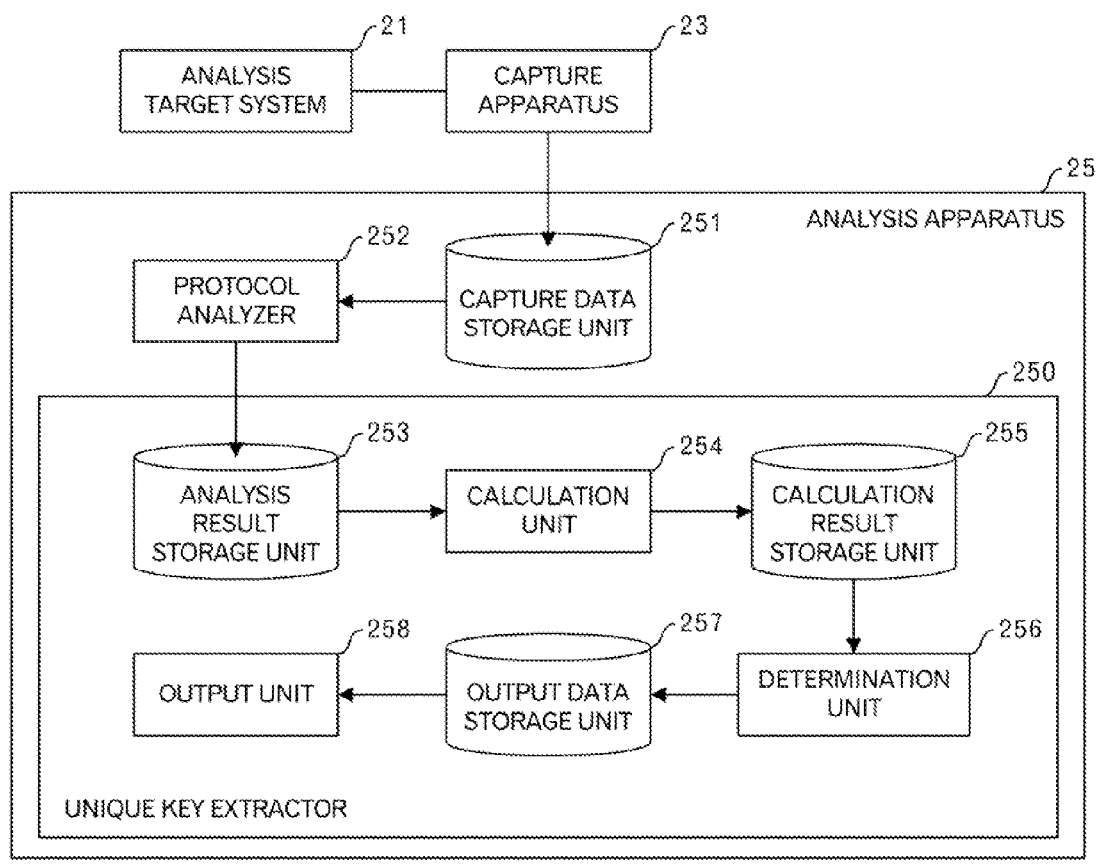
FIG. 6 is a diagram depicting a system outline relating to a second embodiment.

FIG. 6 illustrates a system outline relating to the second embodiment of this technique. An analysis target system 21 such as an electronic commerce system is connected with a capture apparatus 23 through a network such as LAN. In addition, the capture apparatus 23 is connected with an analysis apparatus 25 through a network such as LAN. Incidentally, the analysis target system 21 includes plural servers, and carries out a processing while exchanging the messages among the servers.

The capture apparatus 23 gathers messages exchanged among the servers included in the analysis target system 21, for example, by port mirroring. Then, the capture apparatus 23 assigns data of time (hereinafter, referred to appearance time) when the message is gathered to the gathered message, and transmits the message with the appearance time to the analysis apparatus 25.

The analysis apparatus 25 includes a capture data storage unit 251, protocol analyzer 252 and unique key extractor 250. The unique key extractor 250 includes an analysis result storage unit 253, calculation unit 254, calculation result storage unit 255, determination unit 256, output data storage unit 257 and output unit 258.

The message received from the capture apparatus 23 and appearance time of the message are stored in the capture data storage unit 251 in association with each other. The protocol analyzer 252 carries out a processing by using data stored in the capture data storage unit 251, and stores processing results into the analysis result storage unit 253. The calculation unit 254 carries out a processing by using data stored in the analysis result storage unit 253, and stores processing results into the calculation result storage unit 255. The determination unit 256 carries out a processing by using data stored in the calculation result storage unit 255, and stores processing results into the output data storage unit 257. The output unit 258 carries out a processing to display data stored in the output data storage unit 257 onto a display device or the like.

Figure 7:
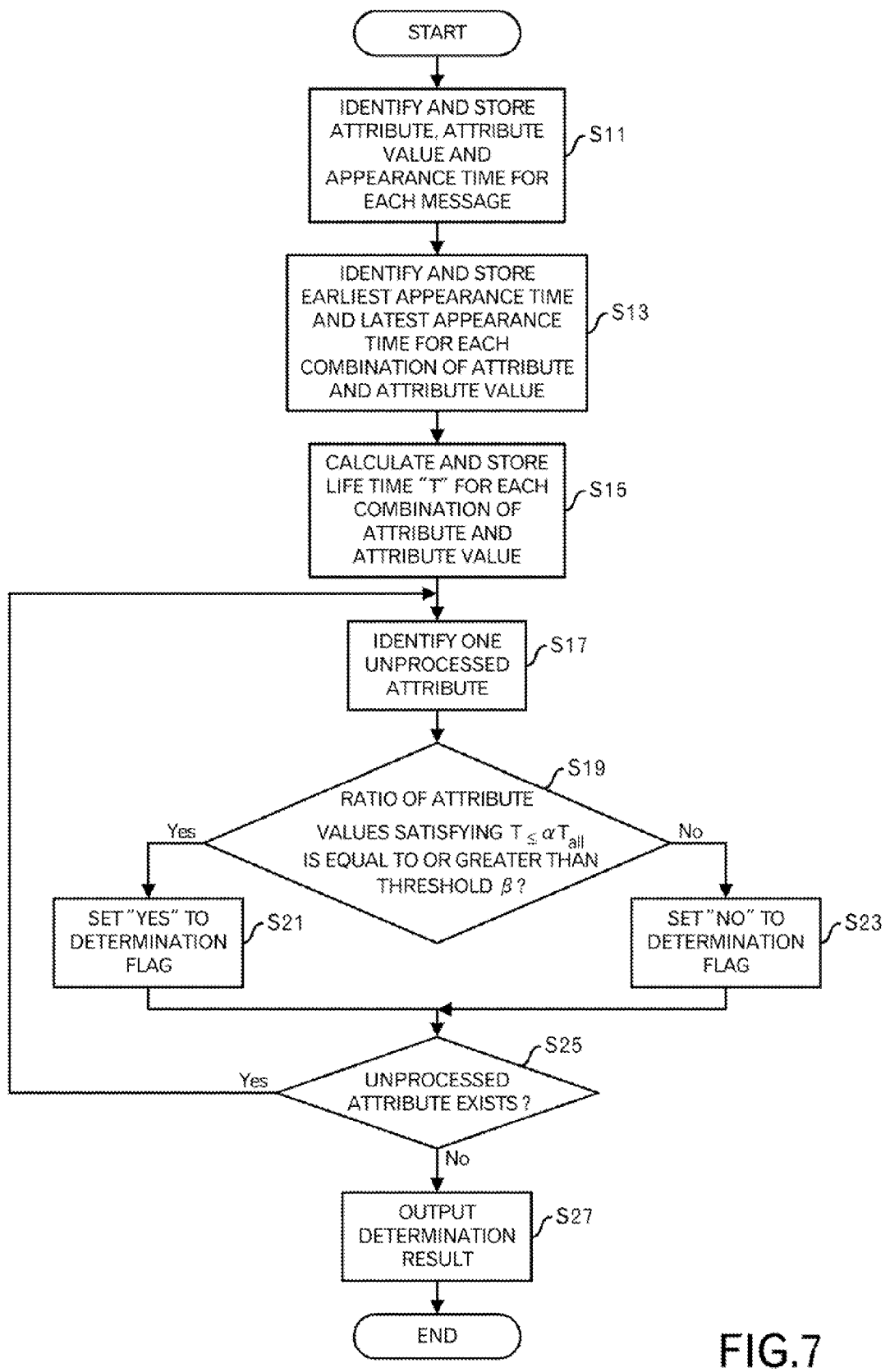
FIG. 7 is a diagram depicting a processing flow of a processing relating to the second embodiment.

Next, processing contents of the analysis apparatus 25 depicted in FIG. 6 will be explained by using FIGS. 7 to 20. First, the protocol analyzer 252 of the analysis apparatus 25 identifies, for each message, the appearance time of the message and tag information (i.e. attribute and attribute value) included in the message, and stores the identified data into the analysis result storage unit 253 (FIG. 7: step S11).

Next, a processing executed at the step S11 is explained by using FIG. 8. First, the protocol analyzer 252 carries out a processing to convert data in a binary format, which is stored in the capture data storage unit 251, into data in a text format, and stores the converted data into a storage unit such as a main memory. Such a conversion processing is carried out by using a protocol decode program (e.g. Wireshark, tcpdump or the like). Data after the conversion is data such as data illustrated in the middle of FIG. 8. In addition, the protocol analyzer 252 identifies, for each message, the appearance time of the message and tag information from the data after the conversion according to the specification of the communication protocol of the analysis target system 21, and stores the analysis results into the analysis result storage unit 253. Data stored in the analysis result storage unit 253 is data such as data illustrated in the bottom of FIG. 8.

Incidentally, in order to make it easy to understand the description, it is assumed that data illustrated in FIG. 9 is stored in the analysis result storage unit 253 in this embodiment. In an example of FIG. 9, data on the left side of "=" represents an attribute, and data on the right side of "=" represents an attribute value.

Figure 10:
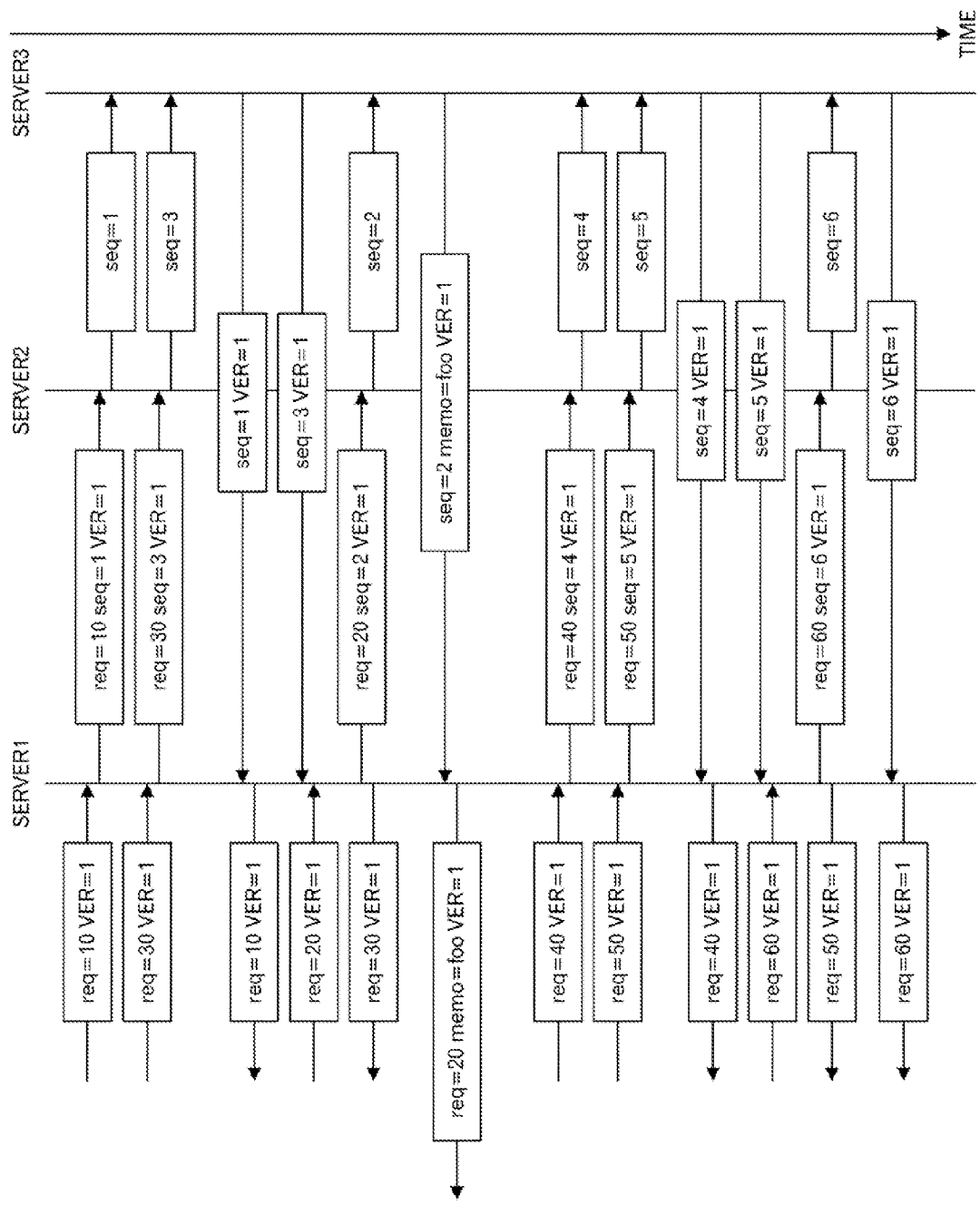
FIG. 10 is a diagram schematically depicting a status of message communication in an analysis target system.

In addition, FIG. 10 is a diagram schematically depicting how the messages 1 to 30 depicted in FIG. 9 are actually transmitted or received. Here, the analysis target system 21 includes servers 1 to 3, and white rectangles in FIG. 10 respectively represents the messages.

Returning to the explanation of FIG. 7, the calculation unit 254 identifies, for each combination of the attribute and attribute values, the earliest appearance time and the latest appearance time among the appearance times of the messages including the corresponding combination of the attribute and attribute value, and stores the identified appearance times into the calculation result storage unit 255 (step S13).

Here, an example of the processing carried out at the step S13 is explained by using FIG. 9. For example, a case is considered where a processing is carried out for "req =10". First, the calculation unit 254 searches the data depicted in FIG. 9 by "req =10". Here, because the search is carried out in ascending order of time, time 1 is identified, firstly. Therefore, the time 1 is "the earliest appearance time". Furthermore, when the calculation unit 254 continues the search, the calculation unit 254 identifies time 2. Therefore, the time 2 is "the latest appearance time" at that time. Furthermore, when the calculation unit 254 continues the search, the calculation unit 254 identifies time 8. Therefore, "the latest appearance time" is updated, and the time 8 becomes the latest appearance time. Then, because "req =10" cannot be identified even when the search is carried out from time 9 to time 30, finally the time 1 is "the earliest appearance time" and the time 8 is "the latest appearance time".

Figures 11, 12, 13A:
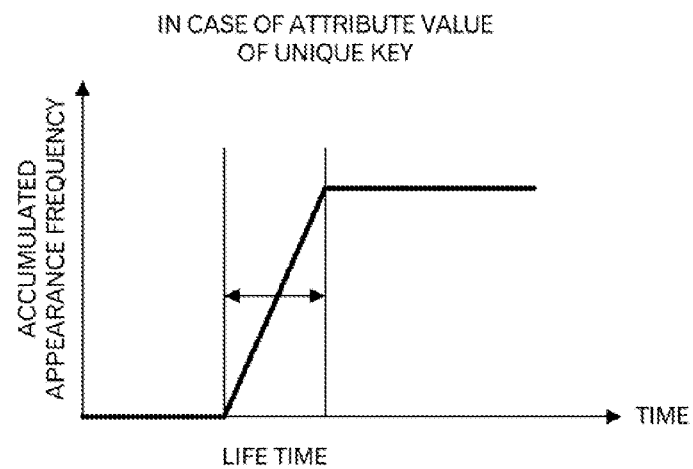
FIG. 11 is a diagram depicting an example of data stored in a calculation result storage unit.
FIG. 12 is a diagram depicting an example of data stored in the calculation result storage unit.
FIG. 13A is a diagram depicting a relationship between time and an accumulated appearance frequency in case of the attribute value of a unique key.

FIG. 11 depicts an example of data stored in the calculation result storage unit 255 when the step S13 has been carried out. In an example of FIG. 11, an attribute, attribute value, earliest appearance time and latest appearance time are stored.

Returning to the explanation of FIG. 7, the calculation unit 254 calculates, for each combination of the attribute and attribute value, a life time T that is a difference between the latest appearance time and the earliest appearance time, and stores the calculated life time into the calculation result storage unit 255 (step S15).

FIG. 12 illustrates an example of data stored in the calculated result storage unit 255 when the step S15 has been carried out. In an example of FIG. 12, an attribute, attribute value, earliest appearance time, latest appearance time and life time are stored.

Returning to the explanation of FIG. 7, the determination unit 256 identifies one unprocessed attribute (hereinafter, referred to attribute to be processed) from among the attributes stored in the calculation result storage unit 255 (step S17). In addition, the determination unit 256 determines, for the attribute to be processed, whether or not a ratio of the attribute values satisfying $T \leq \alpha T_{all}$ is equal to or greater than a threshold β (step S19). Here, $T_{all}$ is a period during which the messages were gathered from the analysis target system 21, and in the example of FIGS. 9, $T_{all}=30-1=29$. In addition, α and β are predetermined thresholds, and for example, in case of $\alpha=0.2$ and $\beta=0.9$, it is confirmed that appropriate processing results can be obtained.

Figure 13B:
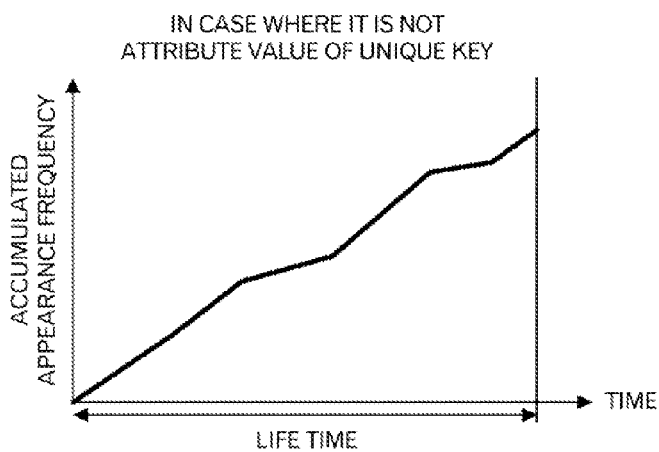
FIG. 13B is a diagram depicting a relationship between time and an accumulated appearance frequency in case where the attribute value is not the attribute value of the unique key.
Figure 14:
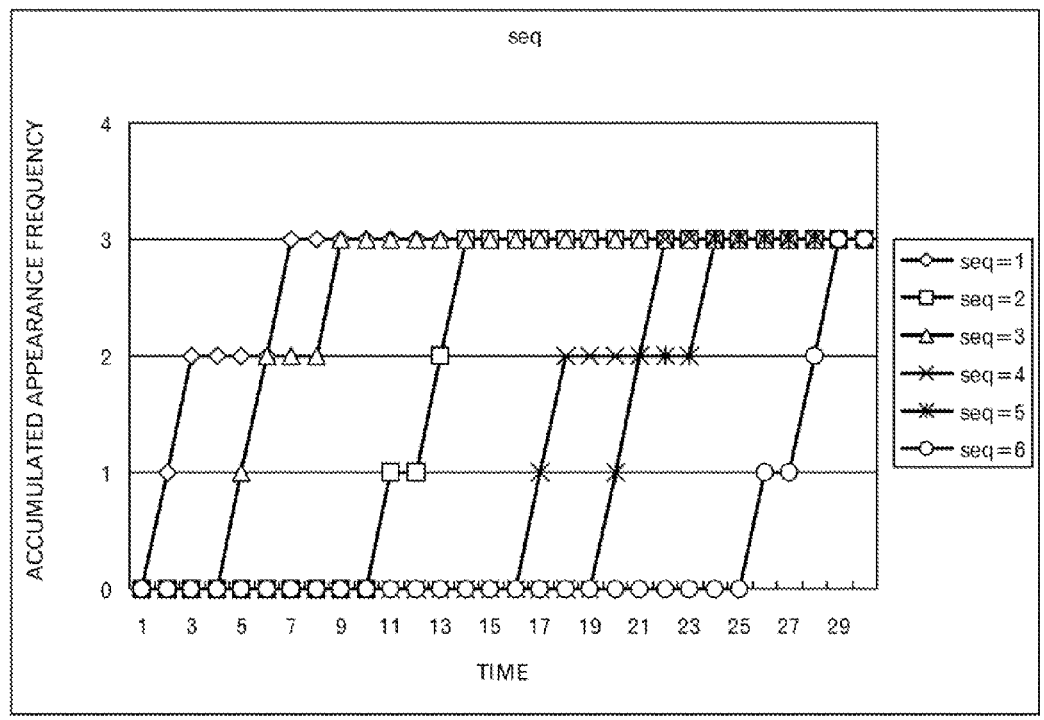
FIG. 14 is a diagram depicting an appearance status of attribute values of an attribute "seq"
Figure 15:
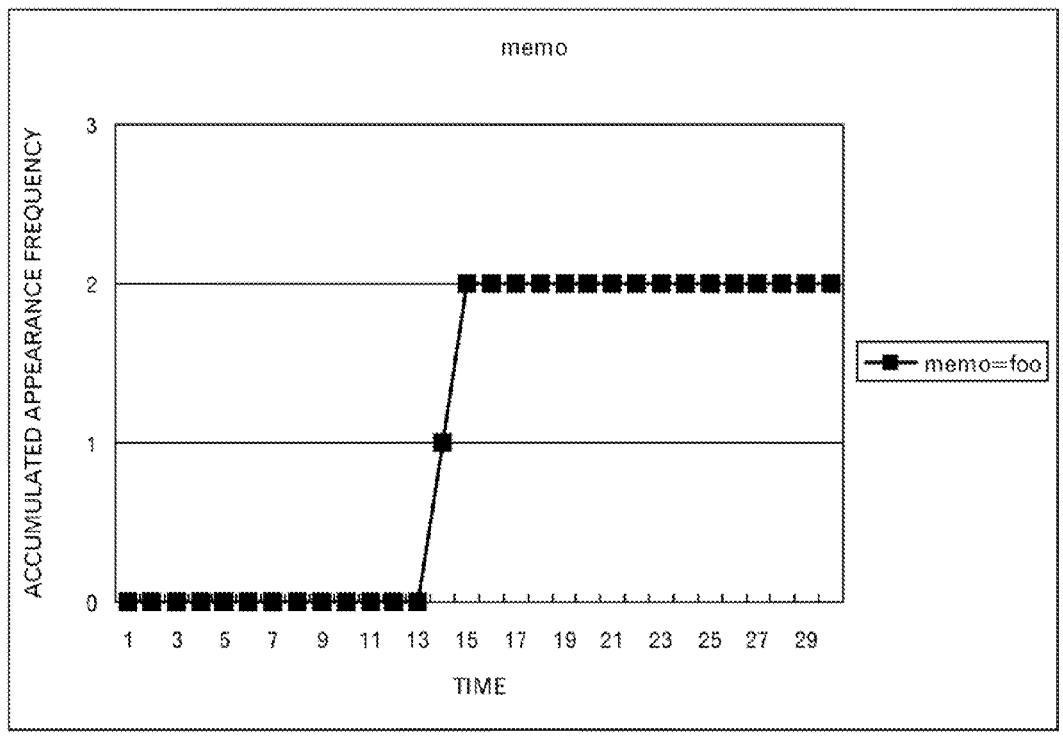
FIG. 15 is a diagram depicting an appearance status of attribute values of an attribute "memo"
Figure 16:
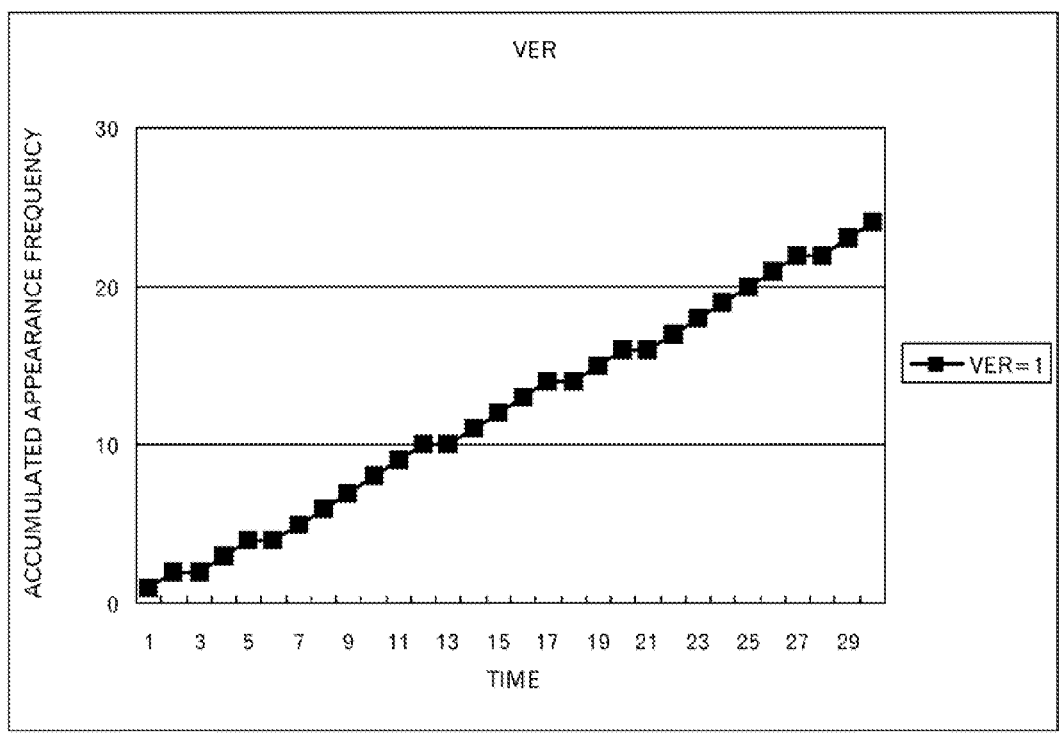
FIG. 16 is a diagram depicting an appearance status of attribute values of an attribute "VER"

Here, an approach of the processing carried out at the step S19 will be explained by using FIGS. 13A to 17. The attribute appropriate for the tying key is an attribute whose attribute value is unique for each transaction (hereinafter, referred to a unique key). When an attribute value being processed is the attribute value of the unique key, this attribute value appears only while a specific transaction processing is carried out. Therefore, a relationship between an accumulated appearance frequency of this attribute value and time is as depicted in FIG. 13A. On the other hand, when an attribute value being processed is not the attribute value of the unique key, this attribute value is used in plural transactions. Therefore, a relationship between an accumulated appearance frequency of this attribute value and time is as depicted in FIG. 13B.

FIGS. 14 to 17 represent relationships between the accumulated appearance frequency and time, for the attribute values of the attributes "seq", "memo", "VER" and "req", which are included in the data depicted in FIG. 9. As for the attribute "seq", the life times of the attribute values are "5", "3", "4", "5", "4" and "3". Here, in case of $\alpha T_{all}=0.3*29\approx9$, the ratio of the attribute values satisfying $T \leq \alpha T_{all}$ is 1 (=6/6). As for the attribute "memo", the life time of the attribute value is "1", and the ratio of the attribute value satisfying $T \leq \alpha T_{all}$ is 1 (=1/1). As for the attribute "VER", the life time of the attribute value is "29", and the ratio of the attribute value satisfying $T \leq \alpha T_{all}$ is 0 (=0/1). As for the attribute "req", the life times of the attribute values are "7", "5", "8", "7", "8" and "5", and the ratio of the attribute values satisfying $T \leq \alpha T_{all}$ is 1 (=6/6). Then, after comparing the ratio calculated for each attribute with β, it is determined that the attribute has possibility of the unique key when the ratio is equal to or greater than β.

Returning to the explanation of FIG. 7, when it is determined that the ratio of the attribute values satisfying $T \leq \alpha T_{all}$ is equal to or greater than the threshold β (step S19: Yes route), the determination unit 256 sets "Yes" to a determination flag corresponding to the attribute to be processed, in the output data storage unit 257 (step S21). On the other hand, when it is determined that the ratio of the attribute values satisfying $T \leq \alpha T_{all}$ is less than the threshold β (step S19: No route), the determination unit 256 sets "No" to the determination flag corresponding to the attribute to be processed, in the output data storage unit 257 (step S23).

Figures 17, 18:
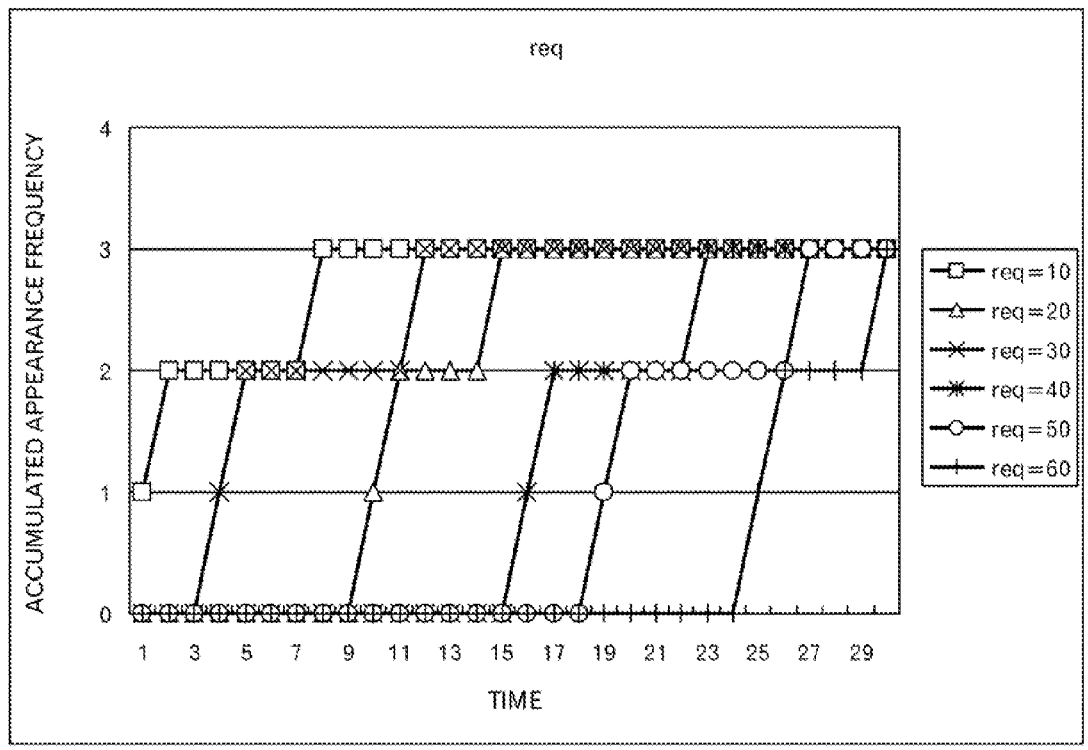
FIG. 17 is a diagram depicting an appearance status of attribute values of an attribute "req"
FIG. 18 is a diagram depicting an example of data stored in an output data storage unit.

FIG. 18 illustrates an example of data stored in the output data storage unit 257. In an example of FIG. 18, a table has a column of the attribute and column of the determination flag. When "Yes" is set to the determination flag, this record represents this attribute is a candidate of the tying key, and when "No" is set to the determination flag, this record represents this attribute is not a candidate of the tying key.

Returning to the explanation of FIG. 7, after the step S21 or S23, the determination unit 256 determines whether or not there is any unprocessed attribute (step S25). When it is determined that there is at least one unprocessed attribute (step S25: Yes route), the processing returns to the step S17 in order to process the next attribute. On the other hand, when it is determined that there is no unprocessed attribute (step S25: No route), the output unit 258 outputs data stored in the output data storage unit 257 to a display device (step S27). Then, the processing ends.

Figure 19:
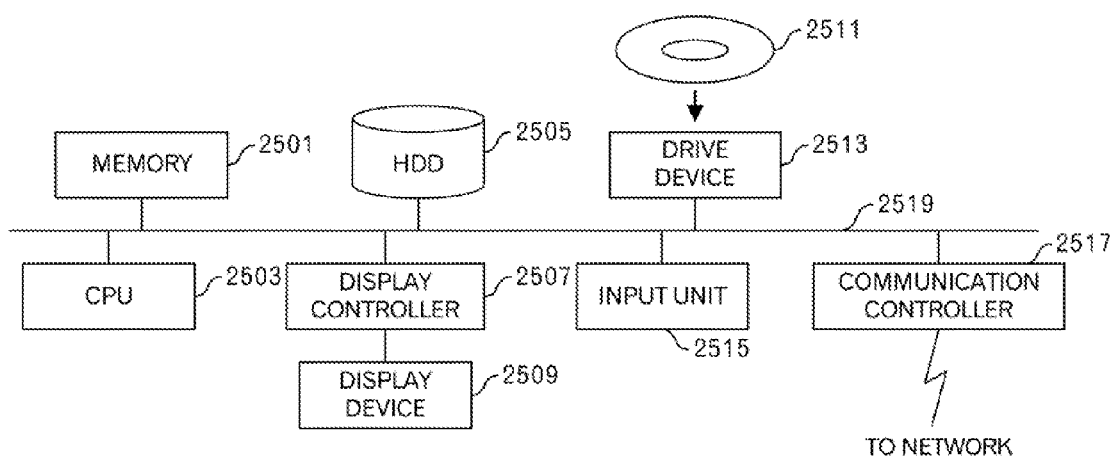
FIG. 19 is a diagram depicting an example of an output screen.

FIG. 19 illustrates an example of a display screen that is outputted by the output unit 258. In an example of FIG. 19, data representing whether or not the attribute is the tying key is displayed for each of the attributes "seq", "memo", "VER" and "req". According to this display, the administrator or the like of the analysis apparatus 25 can determine whether or not the attribute can be employed as the tying key.

Figure 20:
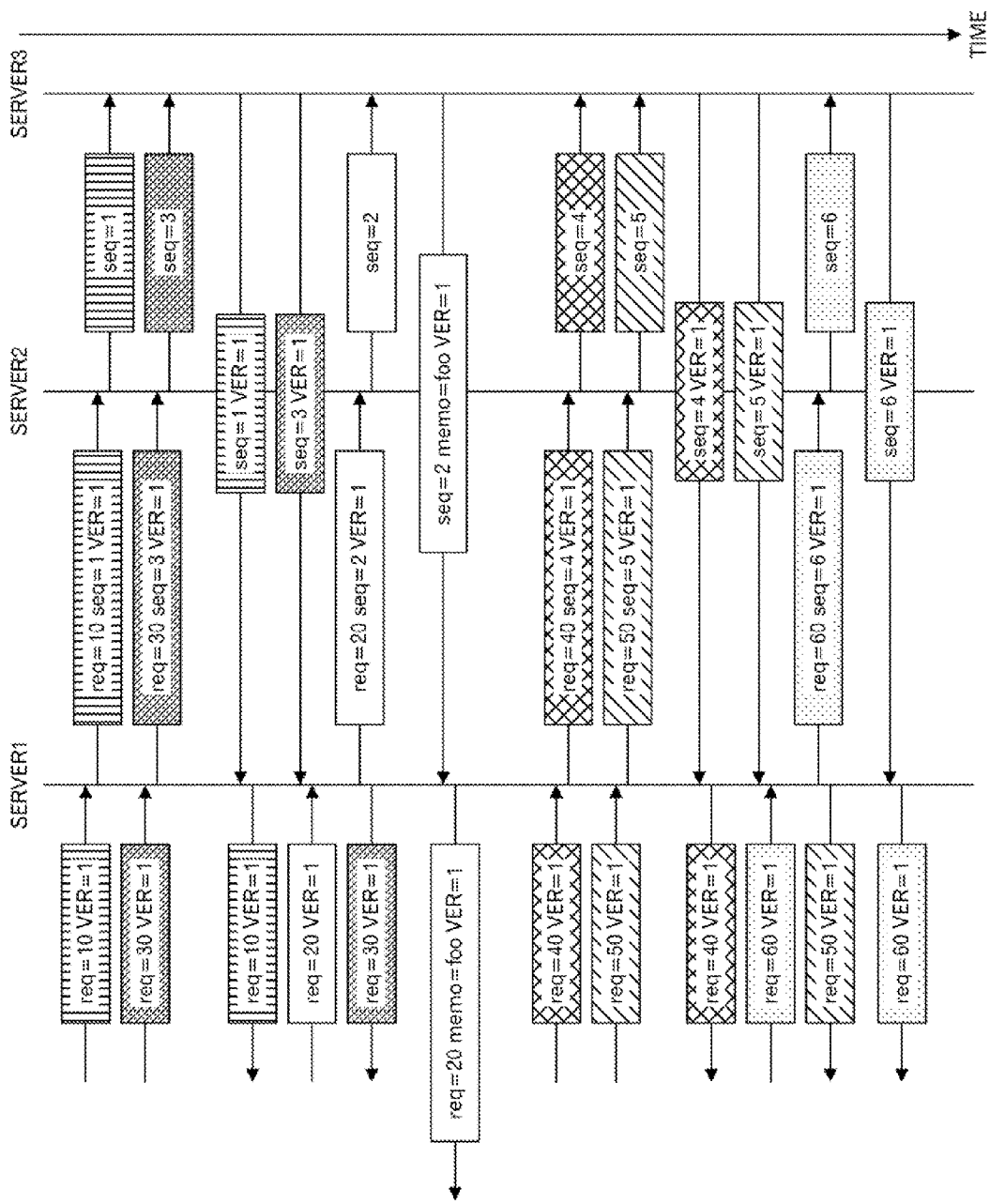
FIG. 20 is a diagram depicting association results of the messages.

FIG. 20 illustrates results that the messages depicted in FIG. 10 are associated by using the attributes "seq" and "req" as the tying key. In FIG. 20, the same decorations are attached to the messages belonging to the same transaction. Like this example, the tying key is not always one, and plural tying keys may be combined to associates the messages. Incidentally, the processing for associating the messages by using a combination of the tying keys is not a main processing in this embodiment. Therefore, the detailed explanation is omitted, here.

By carrying out the aforementioned processing, it becomes possible to identify the tying key or keys for associating the messages from messages that have not been associated.

Although the embodiments of this technique were explained, this technique is not limited to the embodiments. For example, the aforementioned functional block diagrams of the information processing apparatus 15 and analysis apparatus 25 do not always correspond to an actual program module configuration.

In addition, the aforementioned formats of the respective tables are mere examples, and data structures to store data used in the processing are not limited to the aforementioned formats. Furthermore, as for the processing flows, as long as the processing results do not change, an order of the steps may be exchanged. Moreover, the steps may be executed in parallel.

Incidentally, the example that the capture apparatus is used was explained, but a configuration without the capture apparatus may be adopted. For example, an infrastructure (e.g. middleware) that executes application programs activated in the analysis target system outputs logs (e.g. data depicted in FIG. 21) including time, attribute and attribute value. Then, the aforementioned processing is carried out after the outputted logs are collected.

In addition, at the step S19, an average value or median of the life times calculated for the respective attribute values may be calculated, and it maybe determined whether or not the attribute is the candidate of the tying key, by comparing the calculated value with a predetermined threshold.

In addition, the information processing apparatus 15 and analysis apparatus 25 are computer devices as shown in FIG. 22. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 22. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the computer-readable removable disk 2511 and distributed, and then it is installed into the HDD 2505 from the drive device 2513. It maybe installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Incidentally, the protocol analyzer 252, calculation unit 254, determination unit 256 and output unit 258, which are depicted in FIG. 6, may be realized by a combination of the CPU 2503 and programs, namely, the CPU 2503 executing the programs. More specifically, the CPU 2503 may function the aforementioned processing units by operating according to the programs stored in the HDD 2505 or memory 2501. Moreover, the capture data storage unit 251, analysis result storage unit 253, calculation result storage unit 255 and output data storage unit 257, which are depicted in FIG. 6, may be realized by the memory 2501, HDD 2505 or the like in FIG. 22.

The aforementioned embodiments of this technique are outlined as follows:

An information processing method includes: (A) extracting attribute values for a first attribute, which are included in messages, and appearance times of the messages, from a message storage unit storing messages, each including one or plural attribute values for one or plural attributes, and appearance times of corresponding messages, and storing the extracted data into a first data storage unit; (B) calculating, for each of the extracted attribute values for the first attribute, a difference (e.g. life time) between an earliest appearance time and a latest appearance time among the appearance times of the messages including a corresponding attribute value, and storing the calculated differences into a second data storage unit; (C) determining whether or not a ratio of differences that are shorter than a predetermined period among the differences stored in the second data storage unit is equal to or greater than a predetermined threshold; and (D) upon determining that the ratio is equal to or greater than the predetermined threshold, storing data representing the first attribute is a candidate of a key for associating the messages stored in the message storage unit into a third data storage unit.

By carrying out the aforementioned processing, the attribute whose attribute value is presumed to be unique for each set of messages to be associated (e.g. messages belonging to the same transaction) is identified as a candidate of a key (e.g. tying key). Therefore, even when messages to be associated have not been identified, it becomes possible to identify the appropriate candidates of the key from such messages.

In addition, the aforementioned information processing method may further include: (E) upon determining that the ratio is less than the predetermined threshold, storing data representing the first attribute is not the candidate of the key into the third data storage unit. Thus, it becomes possible to cause an administrator or the like to recognize the first attribute is not proper for the key for associating the messages (e.g. tying key).

Moreover, the aforementioned predetermined period may be a value calculated by multiplying a second difference (e.g. message acquisition period) between an earliest appearance time and a latest appearance time among the appearance times stored in the message storage unit by a predetermined rate. Because the same attribute value is used for messages belonging to different transactions when the first attribute is not suitable for the key (e.g. tying key), it is considered that the difference becomes long as the second difference becomes longer. Then, by determining the predetermined period as described above, it becomes possible to prevent the first attribute from becoming the candidate of the key.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer readable medium storing a program for causing a computer to execute a process, the process comprising:

extracting an attribute value for a first attribute from each of messages stored in a storage unit, and an appearance time of each of the messages from the storage unit;

first calculating, for each of extracted attribute values for the first attribute, a difference between an earliest appearance time and a latest appearance time among appearance times of messages that include the extracted attribute value;

second calculating a ratio of the number of differences that are shorter than a predetermined period to the number of differences calculated by the first calculating;

determining whether or not the ratio is equal to or greater than a predetermined threshold; and upon determining that the ratio is equal to or greater than the predetermined threshold, storing data representing the first attribute is a candidate of a key for associating the messages stored in the storage unit.

2. The non-transitory computer readable medium as set forth in claim 1, wherein the process further comprises:

upon determining that the ratio is less than the predetermined threshold, storing data representing the first attribute is not the candidate of the key.

3. The non-transitory computer readable medium as set forth in claim 1, wherein the predetermined period is a value calculated by multiplying a second difference between an earliest appearance time and a latest appearance time among the appearance times stored in the storage unit by a predetermined rate.

4. An information processing method, comprising:

extracting, by a computer, an attribute value for a first attribute from each of messages stored in a storage unit, and an appearance time of each of the messages from the storage unit;

first calculating, by the computer, for each of extracted attribute values for the first attribute, a difference between an earliest appearance time and a latest appearance time among appearance times of messages that include the extracted attribute value;

second calculating, by the computer, a ratio of the number of differences that are shorter than a predetermined period to the number of differences calculated by the first calculating;

determining, by the computer, whether or not the ratio is equal to or greater than a predetermined threshold; and upon determining that the ratio is equal to or greater than the predetermined threshold, storing, by the computer, data representing the first attribute is a candidate of a key for associating the messages stored in the storage unit.

5. An information processing apparatus, comprising:

a storage unit storing messages and appearance times of the messages;

a processor to execute a process, the process comprising:

extracting an attribute value for a first attribute from each of the messages stored in the storage unit, and an appearance time of the messages from the storage unit;

first calculating, for each of extracted attribute values for the first attribute, a difference between an earliest appearance time and a latest appearance time among appearance times of messages that include the extracted attribute value;

second calculating a ratio of the number of differences that are shorter than a predetermined period to the number of differences calculated by the first calculating;

determining whether or not the ratio is equal to or greater than a predetermined threshold; and upon determining that the ratio is equal to or greater than the predetermined threshold, storing data representing the first attribute is a candidate of a key for associating the messages stored in the storage unit.

* * * * *